United States Patent
Chen et al.

(10) Patent No.: US 9,646,060 B2
(45) Date of Patent: May 9, 2017

(54) METHOD AND SERVER FOR PUSHING INFORMATION PROACTIVELY

(71) Applicant: Huawei Device Co., Ltd., Shenzhen, Guangdong (CN)

(72) Inventors: Zhigang Chen, Shenzhen (CN); Cheng Liu, Shenzhen (CN); Haizhang Chi, Shenzhen (CN); Yanmin Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 556 days.

(21) Appl. No.: 13/728,141

(22) Filed: Dec. 27, 2012

(65) Prior Publication Data

US 2013/0117312 A1 May 9, 2013

Related U.S. Application Data

(63) Continuation of application No. PCT/CN2011/080206, filed on Sep. 27, 2011.

(30) Foreign Application Priority Data

Sep. 30, 2010 (CN) .......................... 2010 1 0505939

(51) Int. Cl.
G06F 17/30 (2006.01)

(52) U.S. Cl.
CPC .. *G06F 17/30542* (2013.01); *G06F 17/30864* (2013.01)

(58) Field of Classification Search
CPC ......... G06F 17/30516; G06F 17/30542; G06F 17/30864

(Continued)

(56) References Cited

U.S. PATENT DOCUMENTS 7,831,609 B1 * 11/2010 Alexander .................... 707/765
7,987,459 B2 * 7/2011 Chow ........................ G06F 8/65
717/168

(Continued)

FOREIGN PATENT DOCUMENTS

CN 101409748 A 4/2009
CN 101763597 A 6/2010

(Continued)

OTHER PUBLICATIONS

"Google Scholar Alerts," by Acharya, Anurag. In: Google Scholar Blog (Jun. 15, 2010). Available at: http://googlescholar.blogspot.com/2010/06/google-scholar-alerts.html.*

(Continued)

*Primary Examiner* — Phong Nguyen
(74) *Attorney, Agent, or Firm* — Leydig, Voit & Mayer, Ltd.

(57) ABSTRACT

A method for pushing information proactively includes: receiving updated data; querying search records that match the updated data; determining search records that meet a push condition, and obtaining user information corresponding to the search records that meet the push condition; pushing, according to the user information, the updated data to all or part of users corresponding to the user information. In the embodiments of the present invention, after receiving updated data, the server proactively obtains the search records of users, screens the users according to the push condition, and pushes the updated data to the screened users. In this way, the information is proactively pushed, which shortens the time interval of providing information for the users, and improves the efficiency of obtaining needed information by the users.

13 Claims, 3 Drawing Sheets

(58) Field of Classification Search
USPC .......................................................... 707/780
See application file for complete search history.

(56) References Cited

U.S. PATENT DOCUMENTS

| | | | |
|---|---|---|---|
| 8,892,699 B2* | 11/2014 | Mann ....................... | G06F 8/65 709/217 |
| 2002/0048349 A1* | 4/2002 | Bixler .................... | G06Q 30/02 379/67.1 |
| 2006/0112085 A1* | 5/2006 | Zijlstra et al. .................... | 707/3 |
| 2006/0212865 A1* | 9/2006 | Vincent ..................... | G06F 8/65 717/168 |
| 2006/0218121 A1* | 9/2006 | Keith, Jr. .......... | G06F 17/30327 707/E17.108 |
| 2007/0039023 A1* | 2/2007 | Kataoka ............. | H04N 5/44543 725/46 |
| 2007/0061282 A1* | 3/2007 | Ganguly ........... | H04L 29/06027 707/999.001 |
| 2007/0282795 A1* | 12/2007 | Mashinsky ......... | G06F 17/3089 707/999.003 |
| 2008/0046401 A1* | 2/2008 | Lee et al. ........................... | 707/2 |
| 2008/0059424 A1* | 3/2008 | Tzamaloukas et al. .......... | 707/3 |
| 2008/0071769 A1* | 3/2008 | Jagannathan ..... | G06F 17/30442 |
| 2008/0256443 A1* | 10/2008 | Li ........................ | G06F 3/0486 715/700 |
| 2009/0150535 A1* | 6/2009 | Abbott et al. ................. | 709/223 |
| 2009/0274384 A1* | 11/2009 | Jakobovits ............ | G06F 19/321 382/254 |
| 2010/0017380 A1* | 1/2010 | Naibo ............... | G06F 17/30398 707/E17.136 |
| 2010/0138405 A1* | 6/2010 | Mihaila et al. ................ | 707/713 |
| 2010/0169876 A1* | 7/2010 | Mann ....................... | G06F 8/65 717/170 |
| 2011/0029670 A1* | 2/2011 | Klein et al. ................... | 709/225 |
| 2011/0191314 A1* | 8/2011 | Howes et al. ................ | 707/706 |
| 2012/0284397 A1* | 11/2012 | Cheng ........................... | 709/224 |
| 2012/0290926 A1* | 11/2012 | Kapadia et al. .............. | 715/255 |

FOREIGN PATENT DOCUMENTS

| | | |
|---|---|---|
| CN | 101770459 A | 7/2010 |
| CN | 101782902 A | 7/2010 |
| CN | 101957857 A | 1/2011 |
| JP | 2003316814 A | 11/2003 |
| JP | 2004355210 A | 12/2004 |
| JP | 2007531122 A | 1/2007 |

OTHER PUBLICATIONS

"How the Fuzzy Search option works," by IBM. (Dec. 3, 2003). Available at: http://www-01.ibm.com/support/docview.wss?uid=swg21088269.*
1st Office Action in corresponding Chinese Patent Application No. 201010505939.5 (Sep. 26, 2011).
2nd Office Action in corresponding Chinese Patent Application No. 201010505939.5 (Jun. 26, 2012).
Liu, Hongjun, "Research on the Functions of Personalized Service Databases," Apr. 2007, Zhejiang Tellyou Information Technology Co., Ltd., Zhejiang, China.
International Search Report in corresponding PCT Patent Application No. PCT/CN2011/080206 (Nov. 3, 2011).
Extended European Search Report in corresponding European Patent Application No. 11828110.4 (Mar. 20, 2013).
Written Opinion of the International Searching Authority in corresponding PCT Patent Application No. PCT/CN2011/080206 (Nov. 3, 2011).
Franklin et al., "'Data in Your Face': Push Technology in Perspective," 1998, ACM, New York, New York.

* cited by examiner

METHOD AND SERVER FOR PUSHING INFORMATION PROACTIVELY

CROSS-REFERENCE TO RELATED APPLICATIONS

This application is a continuation of International Patent Application No. PCT/CN2011/080206, filed on Sep. 27, 2011, which claims priority to Chinese Patent Application No. 201010505939.5, filed on Sep. 30, 2010, both of which are hereby incorporated by reference in their entireties.

FIELD OF THE INVENTION

The present invention relates to the field of network technologies, and in particular, to a method and a server for pushing information proactively.

BACKGROUND OF THE INVENTION

With the development and popularity of the Internet and related technologies, some service systems provide people with a huge amount of information through the Internet. More and more marketing activities are conducted online, and searching for information by using the Internet and shopping online gradually become part of people's daily life.

Currently, people search for information or do shopping online mainly by sending information requests, and related service systems that provide information mainly provide information passively. For example, a user enters a key word in the search box on a service provider website to search for information related to the key word, and the search engine of the service provider captures related information in the database according to the key word and provides the related information as a search result for the user, so that the user performs subsequent operations.

However, when the search engine fails to find information that matches the key word in the database, it displays information indicating no search result is found to the user and then ends the information provision process; if data is updated in the database subsequently and information that matches the key word is added, the service system can provide the user with the matched information only when the user initiates access next time and enters the key word to search for information again. The prior art has the following disadvantages: For the service system, providing information passively prolongs the time interval of providing information and reduces the efficiency of obtaining information by users.

SUMMARY OF THE INVENTION

Embodiments of the present invention provide a method and a server for pushing information proactively, so that after updated data is received, information can be proactively pushed to users related to the information, thereby shortening the time interval of providing information.

In order to solve the foregoing technical problems, technical solutions of the embodiments of the present invention are as follows:

An embodiment of the present invention provides a method for pushing information proactively, including:
receiving updated data;
querying search records that match the updated data;
determining whether the search records that match the updated data meet a push condition, and obtaining user information corresponding to the search records that meet the push condition; and
pushing, according to the user information, the updated data to all or part of users corresponding to the user information.

An embodiment of the present invention further provides a server for pushing information proactively, including:
a data receiving unit, configured to receive updated data;
a record querying unit, configured to query search records that match the updated data;
an information querying unit, configured to determine whether the search records that match the updated data meet a push condition, and obtain user information corresponding to the search records that meet the push condition; and
an information pushing unit, configured to push, according to the user information, the updated data to all or part of users corresponding to the user information.

In the embodiments of the present invention, after receiving updated data, the server proactively obtains the search records of users, screens the users according to the push condition, and pushes the updated data to the screened users. In this way, the information is proactively pushed, thereby shortening the time interval of providing information for the users, and improving the efficiency of obtaining needed information by the users. In addition, users are screened by adding a push condition, which effectively saves resources needed for pushing the information and increases the accuracy of pushing information to users, thereby improving the user experience.

BRIEF DESCRIPTION OF THE DRAWINGS

To illustrate the technical solutions in the embodiments of the present invention more clearly, the accompanying drawings required for describing the embodiments or the prior art are introduced briefly in the following. Apparently, the accompanying drawings in the following description merely show some embodiments of the present invention, and persons of ordinary skill in the art can derive other drawings from the accompanying drawings without creative efforts.

DETAILED DESCRIPTION OF THE EMBODIMENTS

To enable persons skilled in the art to further understand the features and technical contents of the present invention, the present invention is hereinafter described in detail with reference to the accompanying drawings. The accompanying drawings are provided for reference only, and are not intended to limit the present invention.

In the prior art, the service system provides information passively. When data information is updated in the database, the service system can provide information for a user only when the user initiates a request to access the data information. This prolongs the time interval of providing information by the service system and reduces the efficiency of obtaining information by the user, and therefore cannot meet people's requirements and is disadvantageous for the user to obtain information. Based on this, embodiments of the present invention provide a method and a server for pushing information proactively, so that information can be pushed to users related to the information proactively after updated data is received.

The following describes the technical solutions of the present invention with the help of drawings and embodiments.

Figure 1:
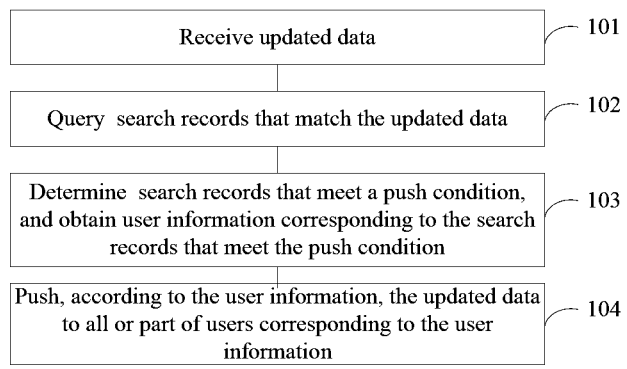
FIG. 1 is a flowchart of a method for pushing information proactively according to an embodiment of the present invention.

FIG. 1 is a flowchart of a method for pushing information proactively according to an embodiment of the present invention.

The method may include:

Step 101: Receive updated data.

When data in a database is updated, the updated data may be sent to a server and received by the server. The server may specifically be a recommendation engine server. The receiving action of the server may be triggered immediately when data is updated, or a time interval is preset, and the server is triggered to receive updated data once at the time interval, or a times threshold may be set, for example, when data update occurs three times in the database, the server is triggered to receive the updated data of the three times. The updated data may specifically include a newly added field in the database or an updated field value of an old field in the database, which is not limited herein.

Step 102: Query search records that match the updated data.

After receiving the updated data, the server queries search records that match the data, where the search records are records about a user's search actions made by the server each time when the server receives a search request from the user. The content of the search records may include key words, database data that matches the key words, search results, browsing times, whether to collect, whether to download, user information, and so on, or a part thereof, which is not limited herein. When querying search records, the server may query the search records according to a matching relationship between the updated data and key words in the search records. Details are provided in the subsequent embodiments.

Step 103: Determine search records that meet a push condition, and obtain user information corresponding to the search records that meet the push condition.

After finding the search records that match the updated data, the server checks whether the search records meet the push condition; if yes, the server further retrieves user information corresponding to the search records. The push condition may be set according to an actual need. The search records that meet the push condition may include one or more of the following: a search record with a search result indicating that no matching item is found, a search record where after a search result is output, the user does not download the found information, a search record where after a search result is output, the user collects one or more pieces of found information, or a search record where after a search result is output, the number of times/pieces of found information browsed by the user exceeds a threshold, where the threshold may be set according to the actual need, for example, three times. The search record with a search result indicating that no matching item is found may be a record where according to the search request of a user, the server fails to find items that match the key word entered by the user. The search record with no downloading may be a record where after the search is completed, the user's final action is no downloading the found information; the search record with collection may be a record that the user may collect information found by the user; the search record with browsing may be a record that the user browses the found information.

After obtaining the search records that meet the push condition, the server further obtains user information corresponding to the search records, where the user information may be login information of the user or identifier information of a terminal used by the user, for example, the login information of the user may be one or more of the following: user name, nickname, and Email; the identifier information of the terminal used by the user may be one or more of the user's mobile phone number or telephone number. A user information database may be set up in advance.

Step 104: Push, according to the user information, the updated data to all or part of users corresponding to the user information.

After obtaining the user information, the server may choose to push the updated data to all or part of users. For example, if the server obtains the Email box of a user, the server may push the updated data by sending an Email to the Email box of the user; or if the server obtains the identifier of a terminal used by the user, for example, a mobile phone number, the server may push the updated data to the terminal of the user by using a PUSH technology. Certainly, other modes may also be used to push the updated data, which are not limited herein.

In this embodiment of the present invention, after receiving updated data, the server proactively obtains the search records of users, screens the users according to the push condition, and pushes the updated data to the screened users. In this way, the information is proactively pushed, thereby shortening the time interval of providing information for the users, and improving the efficiency of obtaining needed information by the users. In addition, users are screened by adding a push condition, which effectively saves resources needed for pushing the information and increases the accuracy of pushing information to users, thereby improving the user experience.

Figure 2:
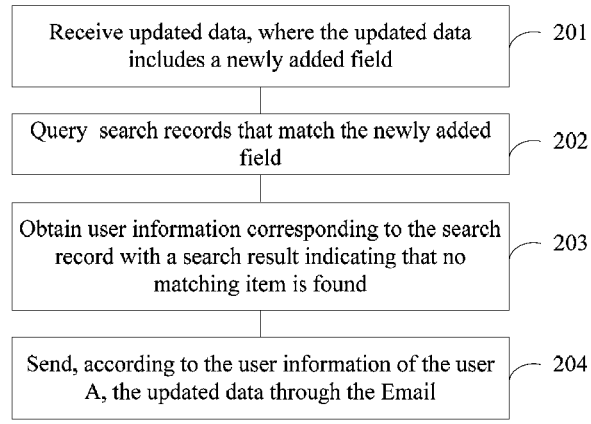
FIG. 2 is a flowchart of another method for pushing information proactively according to an embodiment of the present invention.

FIG. 2 is a flowchart of another method for pushing information proactively according to an embodiment of the present invention.

The method may include:

Step 201: Receive updated data, where the updated data includes a newly added field.

In this embodiment, if a user A enters a key word "camping tent" to search, when the search engine fails to find a search result that matches the key word "camping tent" in the database, the search engine displays information indicating that no matching item is found to the user A. The server keeps the search record of the user A, where the search record may include user information of the user A (for example, Email of the user A), key word "camping tent", and search result indicating that no matching item is found.

When data is updated in the database, the server is triggered to receive updated data. In this embodiment, the updated data includes a newly added field "tent" in the database and the field value of the newly added field is "camping tent" and "mountaineering tent".

Step 202: Query search records that match the newly added field.

The server may query, by using the field name of the newly added field, search records stored on the server, and when the key word or part of the key word of one or more search records is the field name or field value of the newly added field, use the one or more search records as the search record(s) matching the newly added field; or the server may also query, by using the field name of the newly added field, search records stored on the server, and when the key word or part of the key word of one or more search records fuzzily matches the field name or field value of the newly added field, use the one or more search records as the search record(s) matching the newly added field.

In this embodiment, after receiving the newly added field "tent" and the field value thereof, the server retrieves the search records and queries for whether there are search records that match the field name "tent" or field values such as "camping tent" and "mountaineering tent" of the field "tent". In this embodiment, because the key word "camping tent" in the search records of the user A is the same as the field value "camping tent" of the newly added field "tent", the search records of the user A about the key word "camping tent" match the newly added field "tent". Certainly, in other embodiments, a matching rule may be set according to the actual need, for example, the matching rule is set to be that part of the newly added field name or part of the field value corresponding to the newly added field is the same as part of the key word. In this case, using the above example, the search records about the key word "camping tent" may match data of the field value "camping tent", data including the field name "tent", and data of the field value "mountaineering tent", that is, the data of the field name "tent" and the data of the field value "mountaineering tent" match the word "tent" in the key word "camping tent". Then, the search records about the key word "camping tent" are considered to match the newly added field "tent".

Step 203: Obtain user information corresponding to the search record with a search result indicating that no matching item is found.

By querying the search records of the user A, the server knows that the record where "the search result indicates that no matching item is found" meets the push condition, and then obtains information of the user A, which may specifically be the Email of the user A.

Step 204: Send, according to the user information of the user A, the updated data through the Email.

In this step, the server sends the newly added field "tent" in the database and its specific information, for example, the field value, to the Email box of the user A according to the Email address obtained in step 203. Then, the data information is automatically pushed.

In this embodiment, when receiving new information of the database, the server queries for and screens pre-stored search records, and sends the new information to users corresponding to the screened search records. In this way, the information is pushed proactively, thereby shortening the time interval of providing information for users and increasing the efficiency of obtaining needed information by the users. In addition, the users are screened by adding a push condition, which effectively saves resources needed for pushing the information and increases the accuracy of pushing information to the users, thereby improving the user experience.

Figure 3:
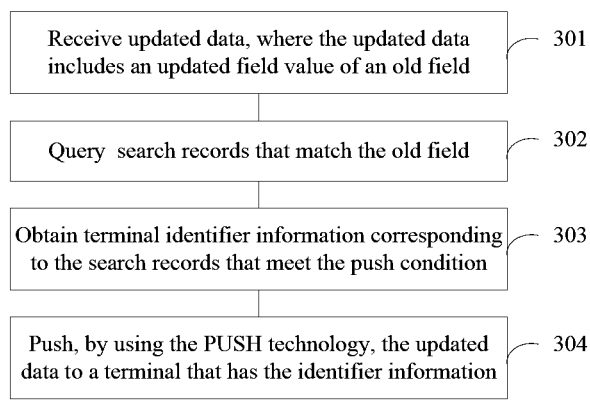
FIG. 3 is a flowchart of another method for pushing information proactively according to an embodiment of the present invention.

FIG. 3 is a flowchart of another method for pushing information proactively according to an embodiment of the present invention.

The method may include:

Step 301: Receive updated data, where the updated data includes an updated field value of an old field.

In this embodiment, if a user B searches by entering a key word "tent", after the search engine finds search results that match the key word "tent" in the database, it displays the search results that match the key word "tent" to the user B. Then, the user B collects one or more pieces of information of the search results. The server keeps the search record of the user B, where the search record may include user information of the user B, search key word "tent", and one or more pieces of information collected from the search results.

When data is updated in the database, the server is triggered to receive updated data. In this embodiment, the updated data information is the updated field value of the old field "tent" in the database.

Step 302: Query search records that match the old field.

The server may query, by using the updated field value of the old field, search records stored on the server, and when the key word or part of the key word of one or more search records is the field name or updated field value of the old field, use the one or more search records as the search record(s) matching the old field; or, the server may also query, by using the updated field value of the old field, search records stored on the server, and when the key word or part of the key word of one or more search records fuzzily matches the field name or updated field value of the old field, use the one or more search records as the search record(s) matching the old field.

In this embodiment, after receiving the updated data of the old field "tent", the server retrieves the search records and query whether there are search records that match the field "tent". In this embodiment, the key word "tent" in the search records of the user B is the same as the field name "tent" of the old field, and therefore the search records of the user B about the key word "tent" match the old field "tent".

Step 303: Obtain terminal identifier information corresponding to the search records that meet the push condition.

By querying the search records of the user B, it can be known that the user B collects one or more pieces of information of the search result, so that the search records meet the push condition. In this case, the server further obtains the user information of the user B. In this embodiment, the user information of the user B is the terminal identifier information of the user B, for example, mobile phone number. In other embodiments, the push condition may be set to a record of "no downloading" or a record where the number of times and/or pieces of information in the "browsed" search result exceeds a preset threshold.

Step 304: Push, by using the PUSH technology, the updated data to a terminal that has the identifier information.

In this step, the server pushes, by using the PUSH technology, the updated field value of the old field "tent" in the database to the terminal that has the above identifier information, so that the data information is automatically pushed. The PUSH technology is the prior art, and is not further described herein.

In this embodiment, when receiving updated field value information of the database, the server queries for and screens pre-stored search records, and sends the updated data to users corresponding to the screened search records. In this way, the information is pushed proactively, thereby shortening the time interval of providing information for users and increasing the efficiency of obtaining needed information by the users. In addition, the users are screened by adding a push condition, which effectively saves resources needed for pushing the information and increases the accuracy of pushing information to the users, thereby improving the user experience.

Persons of ordinary skill in the art may understand that all or part of the steps in the preceding embodiments may be completed by hardware following instructions of a program. The program may be stored in a computer readable storage medium such as a read-only memory (ROM), a random access memory (RAM), a magnetic disk or a compact disk.

Detailed above is a method provided in embodiments of the present invention. The following briefly describes the structure of a server that implements the above method.

Figure 4:
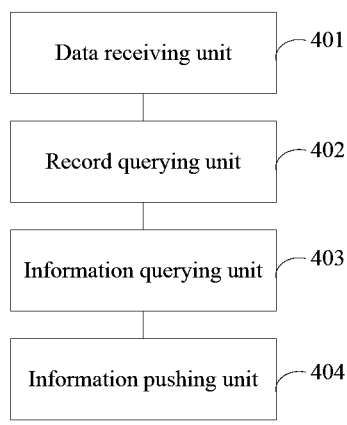
FIG. 4 is a schematic structural diagram of a server for pushing information proactively according to an embodiment of the present invention.

FIG. 4 is a schematic structural diagram of a server for pushing information proactively according to an embodiment of the present invention.

The server may include the following units:

a data receiving unit 401, configured to receive updated data;

a record querying unit 402, configured to query search records that match the updated data;

an information querying unit 403, configured to determine search records that meet a push condition, and obtain user information corresponding to the search records that meet the push condition; and an information pushing unit 404, configured to push, according to the user information, the updated data to all or part of users corresponding to the user information.

In this embodiment, when data is updated in the database, the updated data may be sent to the server, and then received by the data receiving unit 401 of the server, where the updated data may specifically include a newly added field or an updated field value of an old field in the database. After the data receiving unit 401 receives the updated data, the record querying unit 402 queries search records that match the updated data. When querying the search records, the data querying unit 402 may query according to a matching relationship between the updated data and the key word in the search records. After the record querying unit 402 finds search records that match the updated data, the information querying unit 403 checks whether the search records meet a push condition; if true, the information querying unit 403 further retrieves the user information corresponding to the search records, where the push condition may be set according to the actual need and the search records that meet the push condition may include one or more of the following: a search record with a search result indicating that no matching item is found, a search record where after a search result is output, the user does not download the found information, a search record where after a search result is output, the user collects one or more pieces of found information, or a search record where after a search result is output, the number of times and/or pieces of found information browsed by the user exceeds a threshold, where the threshold may be set according to the actual need, for example, three times; and the user information may be login information of the user or identifier information of a terminal used by the user, for example, the login information of the user may be one or more of the following: user name, nickname, and Email, and the identifier information of the terminal used by the user may be one or more of the user's mobile phone number and telephone number, and a user information database may be set up in advance. After the information querying unit 403 obtains user information, the information pushing unit 404 pushes updated data according to the user information.

In this embodiment, by using the above units, the information is pushed proactively, which shortens the time interval of providing information for users and increases the efficiency of obtaining needed information by users; in addition, users are screened by adding a push condition, which effectively saves resources needed for pushing the information and increases the accuracy of pushing information to users, thereby improving the user experience.

Figure 5:
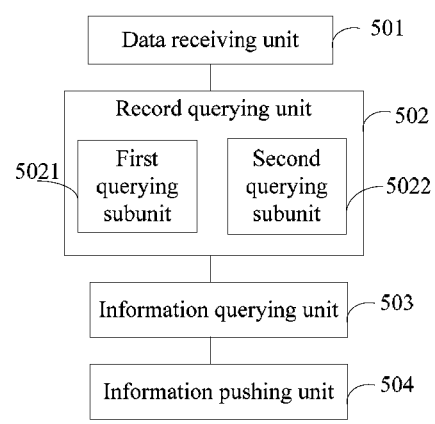
FIG. 5 is a schematic structural diagram of another server for pushing information proactively according to an embodiment of the present invention.

FIG. 5 is a schematic structural diagram of another server for pushing information proactively according to an embodiment of the present invention.

The server may include a data receiving unit 501, a record querying unit 502, an information querying unit 503, and an information pushing unit 504.

The record querying unit 502 may further include:

a first querying subunit 5021, configured to: when the updated data includes a newly added field, query search records that match the newly added field; and a second querying subunit 5022, configured to: when the updated data includes an updated field value of an old field, query search records that match the old field.

In another embodiment, the first querying subunit 5021 may specifically query, by using the field name of the newly added field, search records stored on the server, and when the key word or part of the key word of one or more search records is the field name or field value of the newly added field, use the one or more search records as the search record(s) matching the newly added field; or the server may also query, by using the field name of the newly added field, search records stored on the server, and when the key word or part of the key word of one or more search records fuzzily matches the field name or field value of the newly added field, use the one or more search records as the search record(s) matching the newly added field.

The second querying subunit 5022 may specifically query, by using the updated field value of the old field, search records stored on the server, and when the key word or part of the key word of one or more search records is the field name or updated field value of the old field, use the one or more search records as the search record(s) matching the old field; or, query, by using the updated field value of the old field, search records stored on the server, and when the key word or part of the key word of one or more search records fuzzily matches the field name or updated field value of the old field, use the one or more search records as the search record(s) matching the old field.

The information querying unit 503 may be specifically configured to obtain user information of users who initiate the search records that meet the push condition, where the user information is similar to that provided in the foregoing embodiments, and is not further described herein. The information pushing unit 504 may be specifically configured to obtain terminal identifier information in the user information, and push, by using a PUSH technology, the updated data to a terminal that has the identifier information.

In this embodiment, by using the above units, the information is pushed proactively, which shortens the time interval of providing information for users and increases the efficiency of obtaining needed information by users; in addition, users are screened by adding a push condition, which effectively saves resources needed for pushing the information and increases the accuracy of pushing information to users, thereby improving the user experience. The specific implementation of each unit on the server refers to the method provided in the foregoing embodiments, and is not further described herein.

Embodiments of the present invention described in the foregoing are not limitations for the protection scope of the present invention. Any modification, equivalent replacement, and improvement made without departing from the spirit and principle of the present invention all fall in the protection scope of the embodiments of the present invention.

What is claimed is:

1. A method for pushing information proactively, comprising:
    receiving, by a server, updated data in a database;
    querying, by the server, a search record that includes a previously searched keyword and a previous user activity of a user; wherein at least a part of the search record fuzzily matches at least a part of the updated data, wherein when the updated data comprises a newly added field, querying, by using a field name of the newly added field, the search records, and when a key word or part of the key word of one or more search records is the field name of the newly added field, using the one or more search records as one or more queries that match the newly added field; and
    determining, by the server, that the queried search record meets a push condition, which comprises one of the following:
        (a) when the previous activity indicates that the user did not download a search result related to the previously searched keyword;
        (b) when the previous activity indicates that the user collects one or more pieces of the search result; and
        (c) when the previous activity indicates that a quantity of times or a quantity of pieces of the search result browsed by the user exceeds a threshold;
    obtaining user information corresponding to the queried search record; and
    pushing, by the server, according to the user information, the updated data to the user corresponding to the queried search record.

2. The method according to claim 1, wherein querying the search records comprises:
    when the updated data comprises an updated field value of an old field, querying the search records to identify queries that match the old field.

3. The method according to claim 1, wherein:
    the querying, by using the field name of the newly added field, the search records comprises: when a key word or part of the key word of one or more search records fuzzily matches the field name of the newly added field, using the one or more search records as one or more queries that match the newly added field.

4. The method according to claim 2, wherein querying the search records that match the old field comprises one of the group consisting of:
    querying, by using the updated field value of the old field, the search records, and when a key word or part of the key word of one or more search records is the updated field value of the old field, using the one or more search records as one or more queries that match the old field; and
    querying, by using the updated field value of the old field, the search records, and when a key word or part of the key word of one or more search records fuzzily matches the updated field value of the old field, using the one or more search records one or more queries that match the old field.

5. The method according to claim 1,
    wherein the user information is login information of a user or identifier information of a terminal used by the user stored on the server;
    wherein the login information of the user comprises one or more of the following: user name, nickname, and Email; and
    wherein the identifier information of the terminal used by the user comprises a telephone number of the user.

6. The method according to claim 1, wherein the pushing, according to the user information, the updated data comprises:
    obtaining terminal identifier information in the user information, and pushing, by using a PUSH technology, the updated data to a terminal that has the identifier information.

7. A server for pushing information proactively, comprising:
    a memory storing a computer program comprising instructions; and
    computer hardware configured to execute the instructions in the computer program to:
        receive updated data in a database;
        query a search record that includes a previously searched keyword and a previous user activity of a user; wherein at least a part of the search record fuzzily matches at least a part of the updated data, wherein when the updated data comprises a newly added field, query, by using a field name of the newly added field, the search records, and when a key word or part of the key word of one or more search records is the field name of the newly added field, use the one or more search records as one or more queries that match the newly added field;
        determine that the queried search record meets a push condition, which comprises one of the following:
            (a) when the previous activity indicates that the user did not download a search result related to the previously searched keyword;
            (b) when the previous activity indicates that the user collects one or more pieces of the search result; and
            (c) when the previous activity indicates that a quantity of times or a quantity of pieces of the search result browsed by the user exceeds a threshold;
        obtain user information corresponding to the queried search record; and
        push, according to the user information, the updated data to the user corresponding to the queried search record.

8. The server for pushing information proactively according to claim 7, wherein the instructions further include instructions to:
    when the updated data comprises an updated field value of an old field, query the search records to identify queries that match the old field.

9. The server for pushing information proactively according to claim 8, wherein the instructions further include instructions to:
    query, by using the updated field value of the old field, the search records; and
    when a key word or part of the key word of one or more search records is the updated field value of the old field, use the one or more search records as one or more queries that match the old field.

10. The server for pushing information proactively according to claim 7, wherein the user information is login information of a user or identifier information of a terminal used by the user stored on the server;

wherein the login information of the user comprises one or more of the following: user name, nickname, and Email; and wherein the identifier information of the terminal used by the user comprises a telephone number of the user.

11. The server for pushing information proactively according to claim 7, wherein the instructions further include instructions to:

obtain terminal identifier information in the user information, and push, by using a PUSH technology, the updated data to a terminal that has the identifier information.

12. The server for pushing information proactively according to claim 8, wherein the instructions further include instructions to:

query, by using a field name of the newly added field, the search records; and when a key word or part of the key word of one or more search records fuzzily matches the field name of the newly added field, use the one or more search records as one or more queries that match the newly added field.

13. The server for pushing information proactively according to claim 8, wherein the instructions further include instructions to:

query, by using the updated field value of the old field, the search records; and when a key word or part of the key word of one or more search records fuzzily matches the updated field value of the old field, use the one or more search records as one or more queries that match the old field.

* * * * *